United States Patent [19]

Peyret et al.

[11] Patent Number: 5,923,884
[45] Date of Patent: Jul. 13, 1999

[54] SYSTEM AND METHOD FOR LOADING APPLICATIONS ONTO A SMART CARD

[75] Inventors: Patrice Peyret, Mountain View, Calif.; Gilles Lisimaque, Potomac, Md.

[73] Assignee: Gemplus S.C.A., France

[21] Appl. No.: 08/706,396

[22] Filed: Aug. 30, 1996

[51] Int. Cl.[6] .............................. G06F 13/00; G06F 15/16; G06K 7/01
[52] U.S. Cl. ...................... 395/712; 395/188.01; 235/382
[58] Field of Search .................................. 707/1; 380/20; 235/382, 382.5; 340/825.34; 395/712, 186, 188.01

[56] References Cited

U.S. PATENT DOCUMENTS

| 5,293,424 | 3/1994 | Holtey et al. | 235/382 |
| 5,509,073 | 4/1996 | Monnin | 380/20 |
| 5,588,146 | 12/1996 | Leroux | 707/1 |
| 5,826,011 | 10/1998 | Chou et al. | 395/186 |

*Primary Examiner*—Mark H. Rinehart
*Attorney, Agent, or Firm*—Gray Cary Ware & Freidenrich

[57] ABSTRACT

A system for loading an applet and its associated use rights into a smart card having other applets with associated use rights with values that change as the application is used is provided that stores, remotely from said smart card, an applet and use rights with a predetermined initial value, associated with the applet, and has a smart card having a processing unit, and a memory unit, the memory unit being connected to the processing unit and storing a second application having use rights. The smart card may be connected to said remote storage means, and the application, having use rights with a predetermined value, may be loaded from said remote storage means into said smart card. A smart card is also provided having a processor for executing an application, a memory, connected to the processor, for storing multiple applications, including a first application having first use rights and having first values associated with the first use rights, the first value changing from a predetermined initial value with use of the first use rights, a system for loading in the smart card a second application from a remote location over an interface, the second application having second use rights, a system for storing said second application into said memory in said smart card, and a system for changing the use rights of said first application and said second application. A method of replenishing the use rights in a smart card is also provided.

12 Claims, 7 Drawing Sheets

SYSTEM AND METHOD FOR LOADING APPLICATIONS ONTO A SMART CARD

BACKGROUND OF THE INVENTION

This invention relates generally to secure portable tokens, such as smart cards and in particular to smart cards having reloadable applications.

As is well known, a smart card may be a plastic, credit card-sized card containing a semiconductor chip, such as a microprocessor built into the smart card so that it may execute some simple application programs, which may be referred to as applets. Some examples of the applications in a smart card include security and authentication, information storage and retrieval, and credit and debit operations for managing value accounts, such as prepaid phone time and debit accounts. Each value account application on the smart card has a particular type of use rights associated with the application. For example, a prepaid phone time application may have a predetermined number of prepaid phone minutes that are used up as phone calls are made with the card, and a prepaid public transit account may have an initial preset monetary values which is debited with each use of public transportation. To store and execute these applets, these smart cards have a built-in memory and processor. In order to ensure the security of the use rights on these smart cards, only the processor within the smart card may ordinarily alter the value of the use rights, and only after an authorization sequence has been successfully conducted. The network in which the smart card is being used does not have any direct access to the memory of the smart card nor to the use rights of any application.

There are generally two different types of smart cards, i.e., disposable smart cards and permanent, non-disposable smart cards. A disposable smart card may have a rudimentary semiconductor chip embedded within the smart card and may have a limited amount of memory and some hardwired logic. The disposable smart cards may have a predetermined initial amount of prepaid use rights or other value stored in the memory of the smart card established when the smart card is manufactured. The prepaid use rights are then depleted as the smart card is used. A prepaid phone card or a subway fare card are examples of disposable smart cards because these smart cards are thrown away after the prepaid use rights are depleted. These disposable smart cards are inexpensive because of the rudimentary semiconductor chip, but they have limited utility since their stored value cannot be replenished, and other applications cannot be installed on them. Due to the limited memory and processing power, these disposable smart cards also cannot execute sophisticated cryptographic algorithms, which means that these disposable smart cards are less secure.

The non-disposable, permanent smart cards may have a more complex semiconductor chip embedded within the card, and may have a programmable micro-controller and an expanded memory. The memory may store one or more applets that have separate predetermined amounts of use rights for different functions. Importantly, these permanent smart cards have use rights that may be replenished so that the permanent smart card need not be discarded once the use rights are depleted. Examples of these permanent smart cards include banking cards according to the Europay/Mastercard/Visa standard, and pay television access control cards. These permanent smart cards have more memory for storage of multiple applets and the use rights on the smart card may be separately and independently replenished. However, these permanent smart cards are also more expensive due to the additional memory and the microcontroller, and the replenishment can only be performed by the card issuer.

Initially, many companies issued disposable smart cards due to the lower initial investment. However, due to the security concerns of these disposable smart cards and the limited applications that may be run on these disposable cards, the current trend is to use permanent smart cards because several applications may be loaded onto a single permanent smart card. The permanent smart card is also more secure because more sophisticated cryptographic techniques may be used.

Most conventional permanent smart cards may have a memory unit that may include a read only memory (ROM), a random access memory (RAM), and a non-volatile memory (NVM). The NVM may be, for example, a flash memory such as a flash electrically erasable programmable read only memory (Flash EEPROM), or a EEPROM. These permanent smart cards receive all of their power from the terminal to which they are connected during use. As a consequence, the RAM, which is volatile memory, may be used only as a scratch pad memory for simple computations that do not need to be stored. The ROM, which is permanent, may store the operating system (OS) of the smart card and other programs which do not need to be updated or changed, such as certain permanent applets. The NVM may store certain applets and the use rights secrets or values associated with all applications in the smart card. These conventional permanent smart cards may have multiple applications that reside in the memory of the smart card.

Some conventional permanent smart cards have fixed application programs that are stored in the ROM at the time that the smart card is manufactured. These smart cards do not permit any applications to be stored in the NVM due to security concerns. The programs that are stored in the ROM cannot be altered. The applications for these ROM-based smart cards, however, take a great amount of time to develop because the application must be developed and then be hard wired into the ROM. In addition, these fixed applications are not changeable or removable.

To solve the problems of a fixed application in the ROM, some current smart cards permit applications to be stored in the NVM. However, handling of applications and their associated use rights in the NVM of the smart card poses several problems.

First, there is a security problem since access to the application within the NVM may also permit access, by a clever individual, to the other applications within the NVM unless carefully controlled. In addition, a clever person may figure out a way to replenish his use rights illegally as they are also stored in the NVM. This is an especially large problem for banks that want to issue debit or electronic purse cards since a person could replenish the money available on the smart card without debiting his bank account. For a bank, it is desirable that no one, but the bank have access to the use rights within the smart card. This means that the use rights of any applet on a smart card may only be replenished by the card issuer, such as the bank, which may be inconvenient. In addition, any other company with applets on that smart card must have a relationship with the card issuer.

Second, the replenishing of the use rights of an applet in the smart card may be slow because there must be a number of security procedures that must be followed when use rights are being changed. For example, there must be several authentication procedures to ensure that no illegal activities are occurring.

Third, since each type of application may have a different type of use rights in various different units, such as phone minutes in time units versus cash in monetary units, each different application will probably require a different use rights reload procedure. For example, a use rights reload procedure for phone minutes may not be able to replenish the cash of a debit account on a smart card. Thus, procedures that loads use rights into the smart card must be duplicated.

To limit access to these use right values, conventional permanent smart cards have done several different things. First, some conventional permanent smart cards have controlled the access to certain areas of memory, known as memory zones, so that these memory zones are write-once areas. Other conventional permanent smart cards use a data dictionary, which keeps track of the memory areas in which each of the application must reside. Thus, some sort a memory management system must constantly verify that none of the applications are doing illegal activities.

In summary, some conventional permanent smart cards do not allow any applications to reside in the NVM to reduce security risks. Other conventional permanent smart cards have systems for replenishing the use rights of an application contained on a smart card, but limit this capability to the issuer of the smart card, and require separate loading procedures for each applet. None of these conventional smart card systems provide a system for loading an entire application of any type, including the use rights, into the memory of a permanent smart card. Accordingly, conventional smart cards cannot store disposable applications, such as a prepaid telephone time applet, because there is no method for removing the disposable application once it is depleted or replacing the disposable applet with a new applet. Thus, in conventional smart cards, these depleted disposable applications would remain in the smart card taking up valuable memory space. For this reason, most permanent smart cards today do not have any ability to handle disposable applications.

Thus, there is a need for a system and method for universally reloading different types of use rights in multiple application smart cards which avoid these and other problems of known devices, and it is to this end that the present invention is directed.

SUMMARY OF THE INVENTION

The invention provides a smart card, as well as a system and method for loading applications into the memory of a smart card which may load any type of application and its associated use rights, wherein the use rights may have any type of units. In addition, the system may load one or more disposable applications onto a permanent smart card since those disposable applications, once depleted, may be replaced with a new applet.

The invention also provides an applet loading system for a smart card wherein the use rights associated with an applet may be replenished by reloading the applet and the use rights into the memory of the smart card. The system for loading applications into a smart card may be universal so that a single loading system may be used for a variety of applications. In accordance with the invention, a system and method for reloading applications within a smart card is provided wherein the system may have a storage, remotely from said smart card, that stores an applet and use rights with a predetermined initial value, associated with the applet, and has a smart card having a processing unit, and a memory unit, the memory unit being connected to the processing unit and storing a second application having use rights. The smart card may be connected to said remote storage means, and the application, having use rights with a predetermined value, may be loaded from said remote storage means into said smart card. A smart card is also provided having a processor for executing an application, a memory, connected to the processor, for storing multiple applications, including a first application having first use rights and having first values associated with the first use rights, the first value changing from a predetermined initial value with use of the first use rights, a system for loading in the smart card a second application from a remote location over an interface, the second application having second use rights, a system for storing said second application into said memory in said smart card, and a system for changing the use rights of said first application and said second application. A method of replenishing the use rights in a smart card is also provided.

DETAILED DESCRIPTION OF A PREFERRED EMBODIMENT

The invention is particularly applicable to a system and method for reloading applications having use rights onto a permanent smart card so that the use rights of the application may be replenished when they have been depleted. It is in this context that the invention will be described. It will be appreciated, however, that the system and method in accordance with the invention has greater utility.

Figure 1:
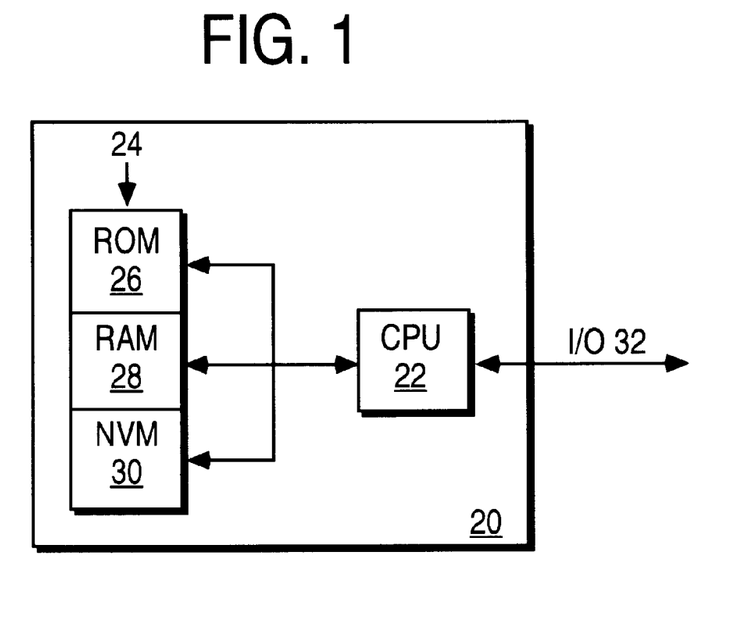
FIG. 1 is a block diagram of a smart card with which the invention may be employed.

FIG. 1 is a block diagram of a smart card 20, also known as a token, of the type with which the invention may be employed. The smart card may be used in connection with the system and method of loading applications into a smart card in accordance with the invention. The smart card may preferably be a permanent smart card, but may also be a disposable smart card. This smart card 20 may have a processor or CPU 22 and a memory 24. The memory may comprise a read only memory (ROM) 26, a random access memory (RAM) 28, and a non-volatile memory (NVM) 30. The NVM may be any type of writable nonvolatile memory, such as an electrically erasable, programmable read only memory (EEPROM), a battery backed RAM, or a flash memory, that can retain stored data when no electrical power is supplied to the memory. The ROM may preferably store the operating system (OS) which controls the operation of the CPU of the smart card, and the RAM may be used as a temporary scratchpad memory. Because the smart card receives its electrical power from the terminal into which it is inserted, as described below, all of the contents of the RAM will be lost when the smart card is removed from the terminal. The NVM may preferably be used to store one or more applications which may be referred to as applets due to the small size of the actual program code. Each of these applets may have associated use rights which are specific to the applet. Other permanent applications that do not change, such as a credit/debit program, may be stored in the ROM.

The processor 22 controls the operation of the smart card. The processor may be connected to all of the memories within the memory system 24. Since there are use rights associated with an application, there is a need to make the smart card secure to prevent theft or alteration of the use rights. To accomplish this security, the processor is the only system that is capable of accessing any of the memories. There is no direct access to any of the memories from outside of the smart card. In addition, any outside access to the memories of the smart card must be conducted through an input/output (I/O) line 32 that is connected to the processor 22. The smart card may also have more than one I/O line provided that access to each I/O line is carefully controlled so that there is no direct access to any of the memories from outside of the smart card. Thus, the processor may authenticate and validate incoming requests prior to making any change in the use rights of an application stored in the smart card, and may prevent unwanted or illegal attempts to decrease the use rights of an application. This authentication and validation may be conducted using cryptographic systems, such as public key encryption, or any other security system. Now, a preferred system for generating applets for a smart card will be briefly described.

Figure 2:
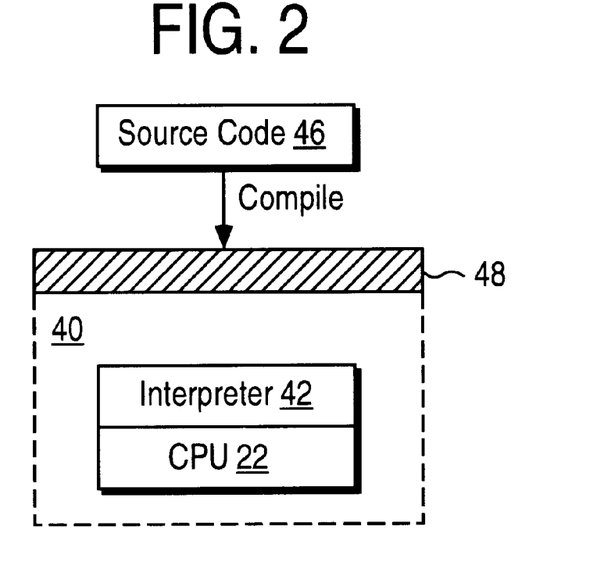
FIG. 2 is a block diagram depicting the creation of a program that may run on the smart card of FIG. 1.

FIG. 2 is a block diagram showing the architecture of the smart card and the manner in which an applet is generated for the smart card. To provide sufficient security for the smart card, a preferred embodiment of a smart card may have a virtual machine 40 contained within the smart card. The virtual machine is comprised of a software interpreter 42 running on the hardware processor 22. The interpreter is a piece of software that acts as an interface between the hardware processor and the applets. In this manner, the applets run through the interpreter so that the applets do not have any direct access to the hardware of the smart card. Thus, the interpreter may verify that none of the applets are performing illegal operations. Instead of a complete interpreter and virtual machine, the smart card may have a command dispatcher to control the access of the applets to various portions of the smart card. The dispatcher may control access of the applets to the hardware by preventing the applets from receiving any access until an authentication check has been completed. A command dispatcher may be considered to be a reduced version of a general interpreter, and the command dispatcher interprets commands received from the applications instead of interpreting the entirety of the code of the applications.

To execute an applet on an interpreter, as shown, source code 46 of an applet is compiled into a byte code 48. The byte code may then be executed by any interpreter on any smart card. The details of the architecture of the preferred smart card are set forth in more detail in PCT Application No. PCT/NL95/00055, published as International Publication No. WO 95/22126, which is incorporated herein by reference. The organization of programs within the memory of the smart card will now be described.

Figure 3:
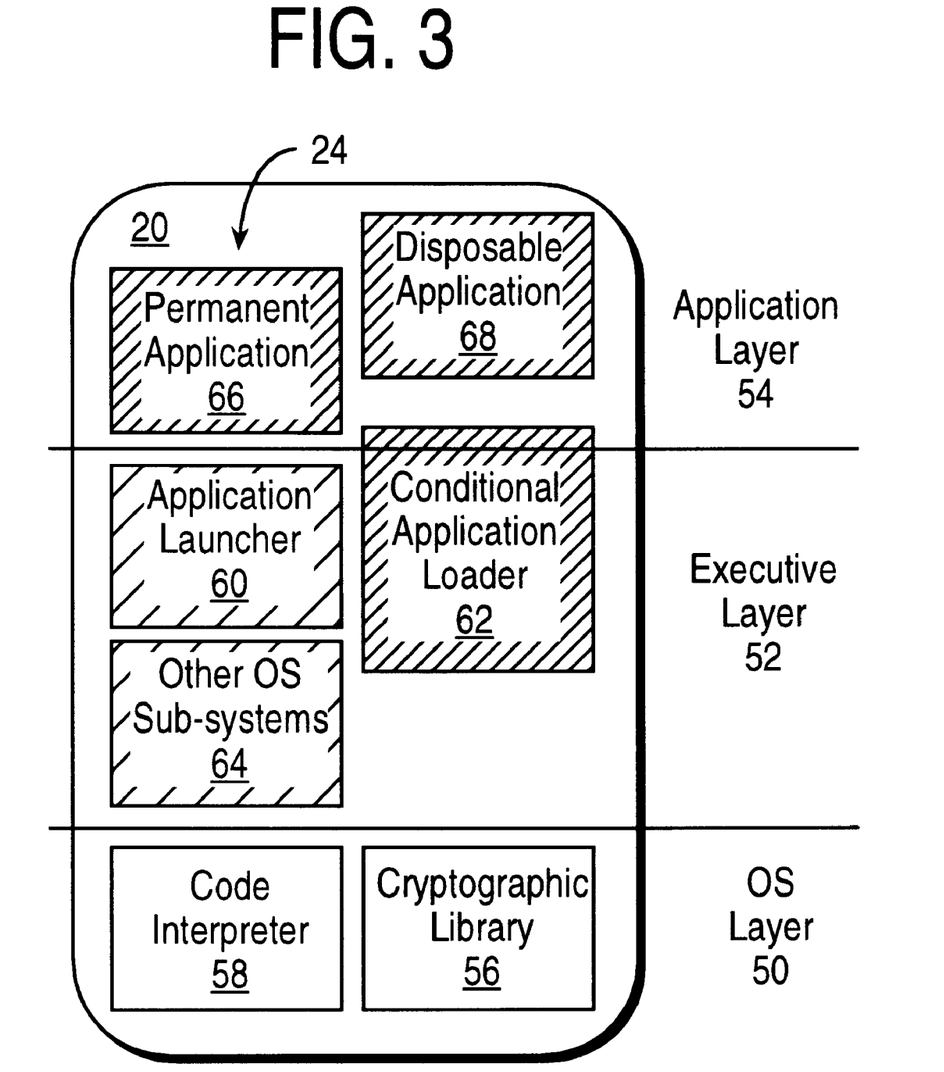
FIG. 3 is a block diagram of the memory organization of the smart card of FIG. 1.

FIG. 3 is a block diagram of the memory organization of the smart card 20 that may include a system for loading applets into the smart card in accordance with the invention. The memory 24 of the smart card, which may include the ROM and NVM, may be logically organized into an OS layer 50, an executive layer 52, and an application layer 54. The OS layer may contain the most basic operating software, such as a cryptographic library 56, and an interpreter 58. These programs are permanent and may be stored in the ROM. The cryptographic library may be used for authenticating access to the smart card, as described above. The interpreter 58, as described above, may be used to prevent an applet from directly accessing the hardware of the smart card.

The executive layer 52 may contain, for example, an application launcher 60, a conditional application loader 62 in accordance with the invention, and other OS sub-systems 64. The application launcher receives a request to access an application, and after appropriate authentication, launches and controls the applet. The conditional application loader 62 controls the loading of an application, or applet, into the NVM of the smart card. The application loader may verify that the remote system desiring to load an applet into the smart card has the appropriate authority, and then may perform the necessary operations, as described in more detail below, to load the applet into the NVM of the smart card.

The application layer 54 may contain a permanent application 66 and one or more disposable applications 68 having associated use rights. The permanent application may be stored in the ROM since it is permanent and may be a credit/debit system that performs all of credit and debit transactions for all of the disposable applications having use rights within the smart card. The credit/debit system may operate with any type of use rights so that only a single credit/debit application is needed for each smart card. In this manner, the use rights of any applet within the smart card may be changed by the permanent credit/debit application 66. In a preferred embodiment of the invention, the loader 62 and the credit/debit application 66 may be a single program since both programs operate on all of the applets having use rights. For example, an applet with use rights needs the credit/debit application to authorize the reload if the applet when the use rights have been depleted, as described below.

The disposable application 68 may be any type of application or applet with a limited lifetime, as defined by a certain number of use rights, such as a predetermined number of telephone call minutes, a predetermined amount of money, or a predetermined number of store credits. As described below in more detail, conventional smart cards that replenished the use rights of a particular application require a separate use rights loading system for each different application because the use rights of each application may require different handling and security. For example, replenishing a certain number of store frequent buyer points onto a smart card may be different than replenishing the cash value of a debit applet, such as a point-of-sale applet, in the smart card. In addition, in order to replenish the use rights of any applet, the smart card needed to be physically connected with or returned to the card issuer since only the card issuer had the authority the alter the use rights for an applet. Therefore, every company who may have an applet on the smart card, must have a relationship with the card issuer so that the card issuer can replenish the use rights of that applet.

Significantly, however, the smart card in accordance with the invention may have a universal applet loader that may delete and then reload an entire applet instead of establishing a connection between the smart card and the applet issuer who then just reloads the use rights. Reloading the entire applet into the smart card means that the loader does not have to be specialized to handle the multiplicity of different types of use rights which could be present in the smart card since the entire applet, including the use rights, is being reloaded into the smart card. The loading of an applet into a smart card to permit the replenishment of the use rights of an applet will be described in more detail below.

The universal loader 62 in accordance with the invention may also be used to load new applets into a smart card, provided that the smart card has available memory. In addition, the universal loader may also permit an applet with depleted use rights to be deleted from the memory of the smart card and replaced with a new different application having refreshed use rights. Each of these operations will be described in more detail below. A preferred system, external to the smart card, for loading applets having use rights, into the smart card will now be described.

Figure 4:
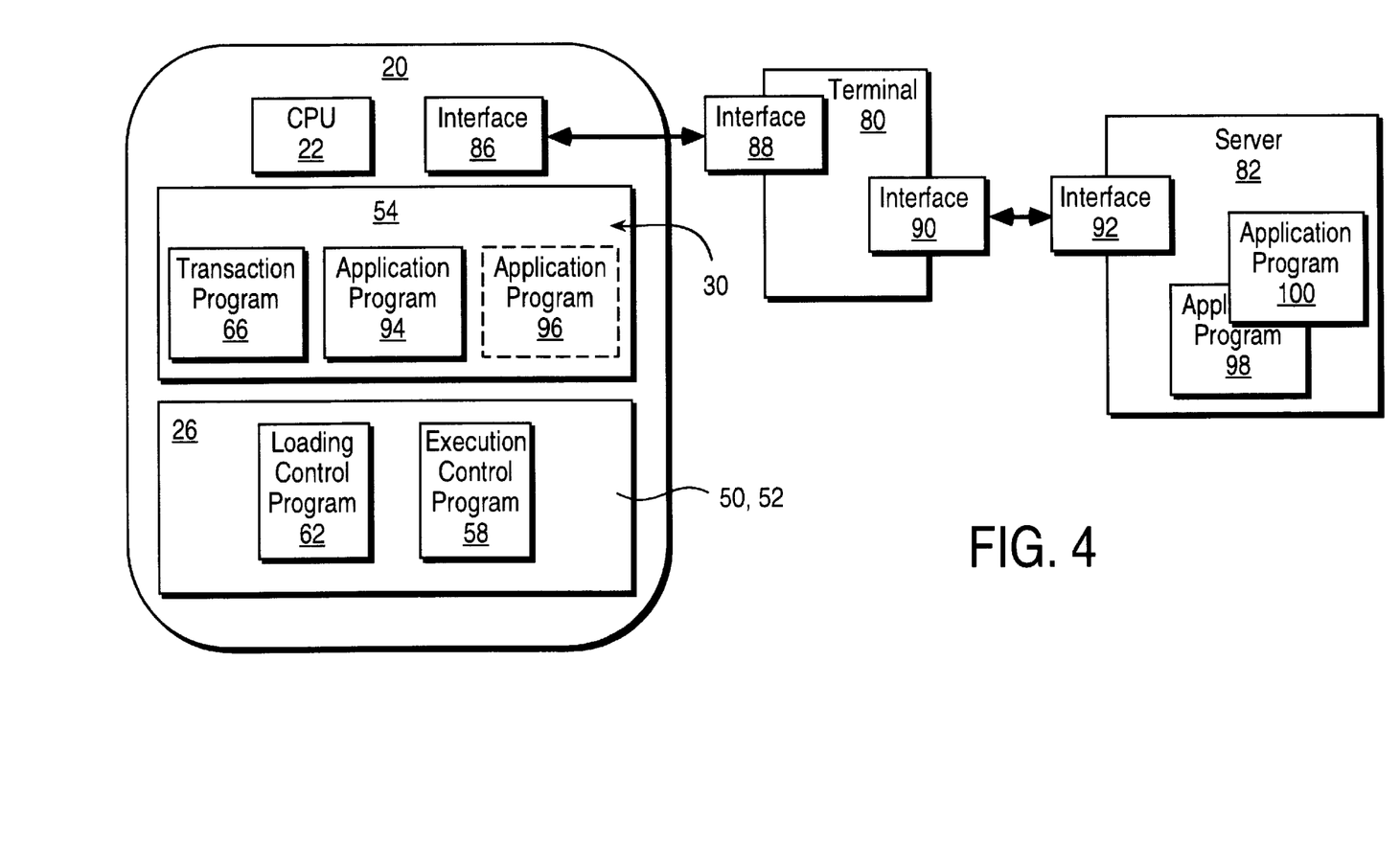
FIG. 4 is a block diagram of a preferred system for reloading applications onto a smart card.

FIG. 4 is a block diagram showing a system in accordance with the invention for loading an applet having use rights into a smart card. The system may include the smart card 20, a terminal 80, and a server 82. The smart card 20 is described above with reference to FIGS. 1–3. The terminal may be operated by the smart card issuer, or by some other entity, such as a bank. The terminal may be a bank ATM teller, a terminal in a bank or a home computer system. The server may be maintained by a bank or the issuer of the smart card, and may contain downloadable applets. The connection between the terminal and the server may be any conventional network, such as the usual connection between ATM machines across the world.

As described above, the smart card may have the processor 22, the OS layer 50 and the executive layer 52 stored in the ROM 26, and the applications layer 54 stored in the NVM 30. In addition, the smart card may have an interface system 86 that may connect the smart card to the terminal 80 using a corresponding interface 88. A second interface 90 may connect the terminal to the server 82 via an interface 92. Thus, the smart card may be connected, through the terminal, to the server. A preferred method of loading an application into the smart card will now be described.

When the smart card is connected to the terminal, the processor 22, using the loader 62, verifies the authenticity of the terminal and of the server. The terminal and the server may also verify the authenticity of the smart card. For example, when the smart card is connected to the terminal, the user may enter a personal identification number (PIN) that may be verified by the server. As another example, the server may send a coded word that must be correctly answered by the smart card. If the server and the smart card authenticate each other, then the universal loader 62 within the smart card begins the loading process. The applets stored on the server, regardless of the type of use rights, may all have a common structure so that the universal loader does not have to distinguish between different types of applets except to identify which one(s) to load. As shown, the NVM 30 may currently store the permanent credit/debit application 66, and an existing first applet 94 with use rights. After the loading operation, as described below, the NVM memory may also have a second new applet 96 with use rights. In the smart card shown, the use rights of the first applet 94 have been depleted. Therefore, a new copy of the applet 98 with refreshed use rights, located on the server 82, may be loaded into the NVM of the smart card. The applet 98 with refreshed use rights replaces the original applet 94 with depleted use rights.

In addition to the replenishment of use rights, a new 100 applet having use rights may be loaded into the smart card 20 from the server 82 in a similar manner. Therefore, after the load process is complete, the smart card may have a first applet with replenished use rights, and the new second applet 96 with predetermined use rights. As an example, a smart card that has a telephone call applet with depleted use rights may have a new telephone call applet with refreshed use rights as well as a debit applet with a predetermined value, e.g., $100, loaded onto the smart card. The connections between the terminal 80 and the server 82 may be conventional network system that may be used for home banking and the like. Several examples of loading applets into a smart card, in accordance with the invention, will now be described.

As described above, conventional smart cards replenish the use rights of an applet by reloading new use rights into an applet on the smart card. The problems with reloading the use rights of an applet into a smart card have been described above. Now, several examples of the operation of the applet loading system in accordance with the invention will be described.

Figure 5:
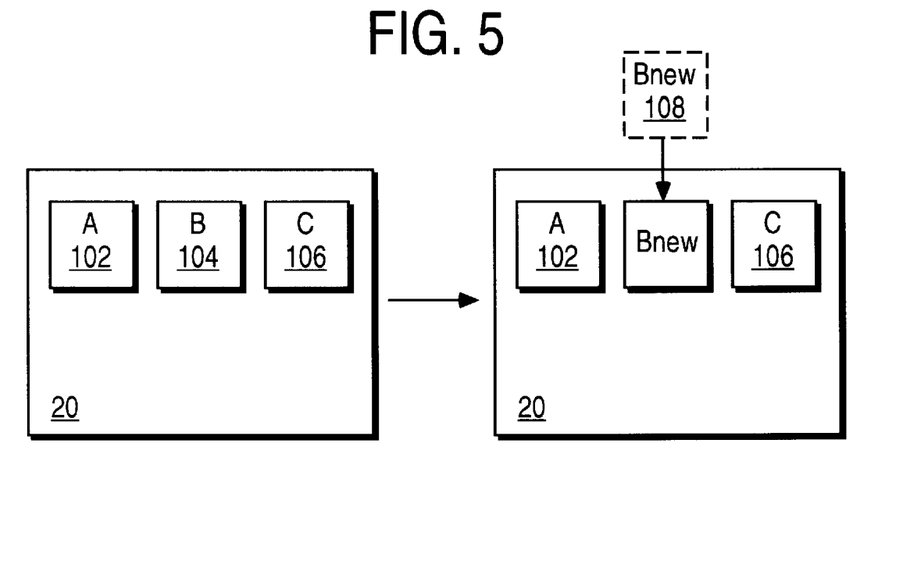
FIG. 5 is a block diagram of a first embodiment of a method in accordance with the invention of reloading an application into a smart card.

FIG. 5 is a block diagram of the loading system in accordance with the invention being used to replenish the use rights of an applet within a smart card. As shown, the smart card 20 may have, for example, a first applet 102, a second applet 104, and a third applet 106. In this example, the first and third applets have use rights remaining, whereas the second applet needs to have its use rights replenished. In accordance with the invention, a new second applet 108 with replenished use rights is loaded into the smart card 20 and replaces the old second applet 104. Thus, after the loading process, the smart card may have a first applet 102, a third applet 106, and a new second applet 108 with replenished use rights. As shown, only the second applet is affected by the loading process. As described above, since the entire applet is loaded back into the smart card, the type of the use right of the applet is irrelevant, and the loading system may reload any type of applet within the smart card regardless of the type of use rights that the applet may have.

Figure 6:
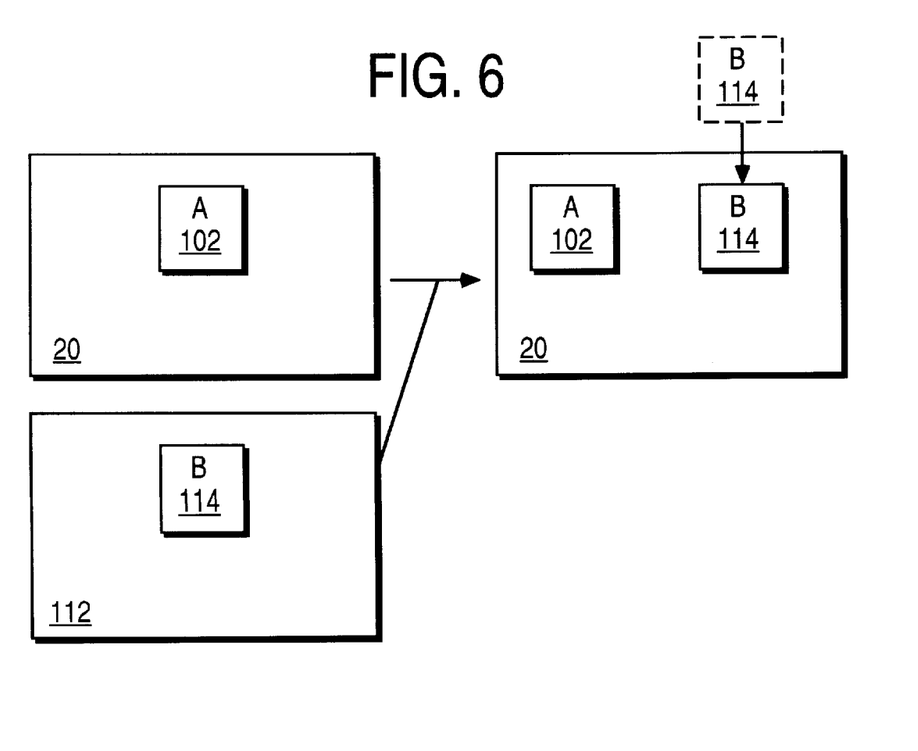
FIG. 6 is a block diagram of a second embodiment of a method in accordance with the invention of reloading an application into a smart card.

FIG. 6 is a block diagram of the loading system in accordance with the invention being used to load a disposable application onto an existing smart card. As shown, the smart card 20 may have a first applet 102. In addition, at a remote system 112, a disposable applet 114 may be stored. The disposable applet may be loaded into the smart card 20 so that the smart card may contain the first applet 102 and the new disposable applet 114. The disposable applets may be easily loaded into the smart card. In addition, once the use rights of the disposable applet are exhausted, the disposable applet may be replaced, using the loading method in accordance with the invention, with a new applet having new use rights.

For example, a user may take a trip to a foreign country and desire some local currency to be placed on the smart card so that he does not have to carry any cash. At the end of the trip, the user does not want to keep the foreign currency applet since he will not have any further need for it. Thus, the invention enables the foreign currency applet to be replaced by, for example, a prepaid telephone call applet.

Figure 7:
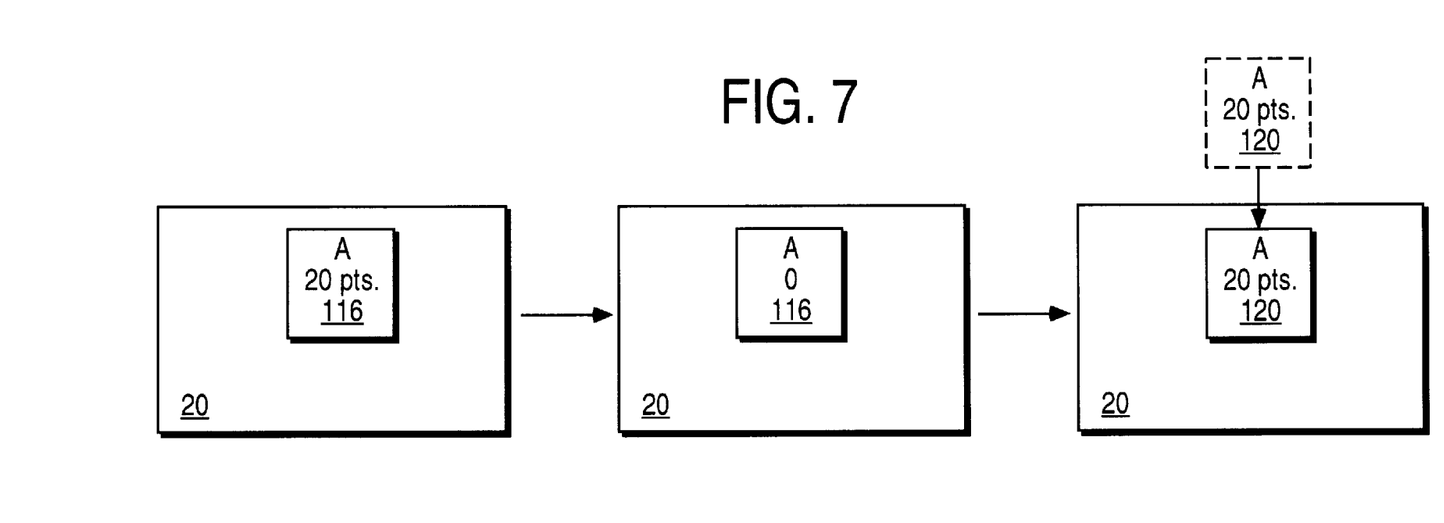
FIG. 7 is a block diagram of a third embodiment of a method in accordance with the invention of reloading an application into a smart card.

FIG. 7 is a block diagram of the loading system in accordance with the invention being used to replenish the use rights of an applet in a smart card. In this example, the smart card 20 has a single applet 116 with use rights. After some time, the use rights of the applet have been depleted. In accordance with the invention, the applet 116 may be replaced by a new applet 120 that has the same functions as the old applet, but has replenished use rights.

The invention, as shown, is not limited to any particular number of applets and may by used to replenish the use rights of as few as a single applet or to replenish the use rights multiple applets. The invention may also be used to load and replace a single disposable applet onto a smart card. A method of debiting use rights in a smart card will now be described.

Figure 8:
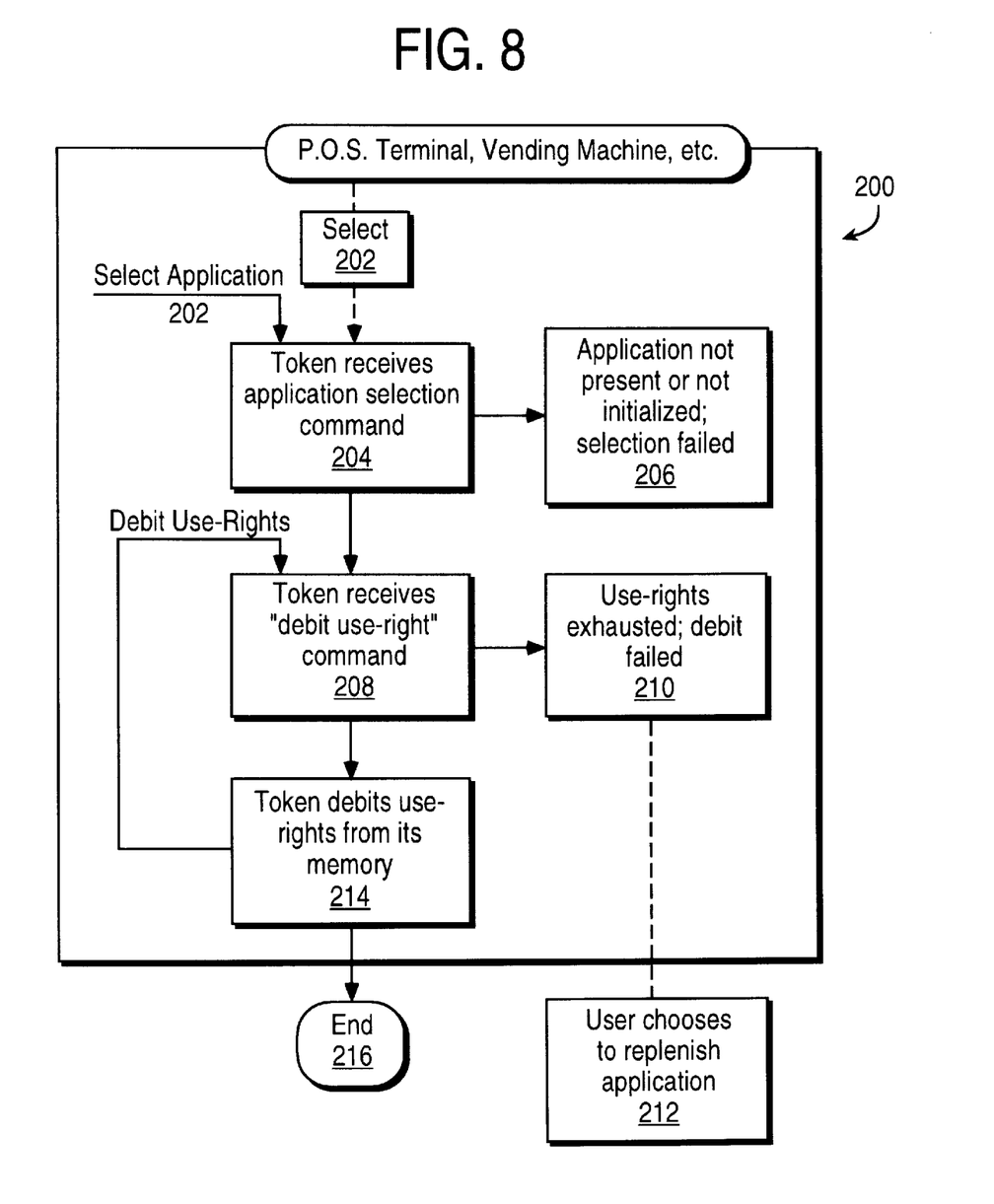
FIG. 8 is a flowchart of a method of debiting use rights in a smart card.

FIG. 8 is flowchart of a method 200 of debiting use rights in a smart card. First in step 202, an applet within the smart card may be selected. For example, when a smart card is placed into a telephone terminal, then the applet with the telephone use rights may be selected by the terminal. In order to select the applet, the smart card may verify that the terminal has the proper authority to access that particular applet. Then, at step 204, the smart card receives an application selection command from the terminal, for example. If the application selected is not initialized or present in the smart card, the method ends in step 206. If a valid application is selected, then in step 208, after a debit use rights command is issued, the smart card receives a debit use rights command at step 208. If the use rights have been exhausted already, then in step 210, the debit fails, and in step 212, the use rights of the applet may be replenished, as described below. If a valid debit command is received, then in step 214, the decreased use rights of the applet are calculated and stored in the memory of the smart card. Then, if there are additional debits for the applet, the method loops to step 208, otherwise the method ends at step 216. The method of replenishing the use rights for an applet on the smart card in accordance with the invention will now be described.

Figure 9:
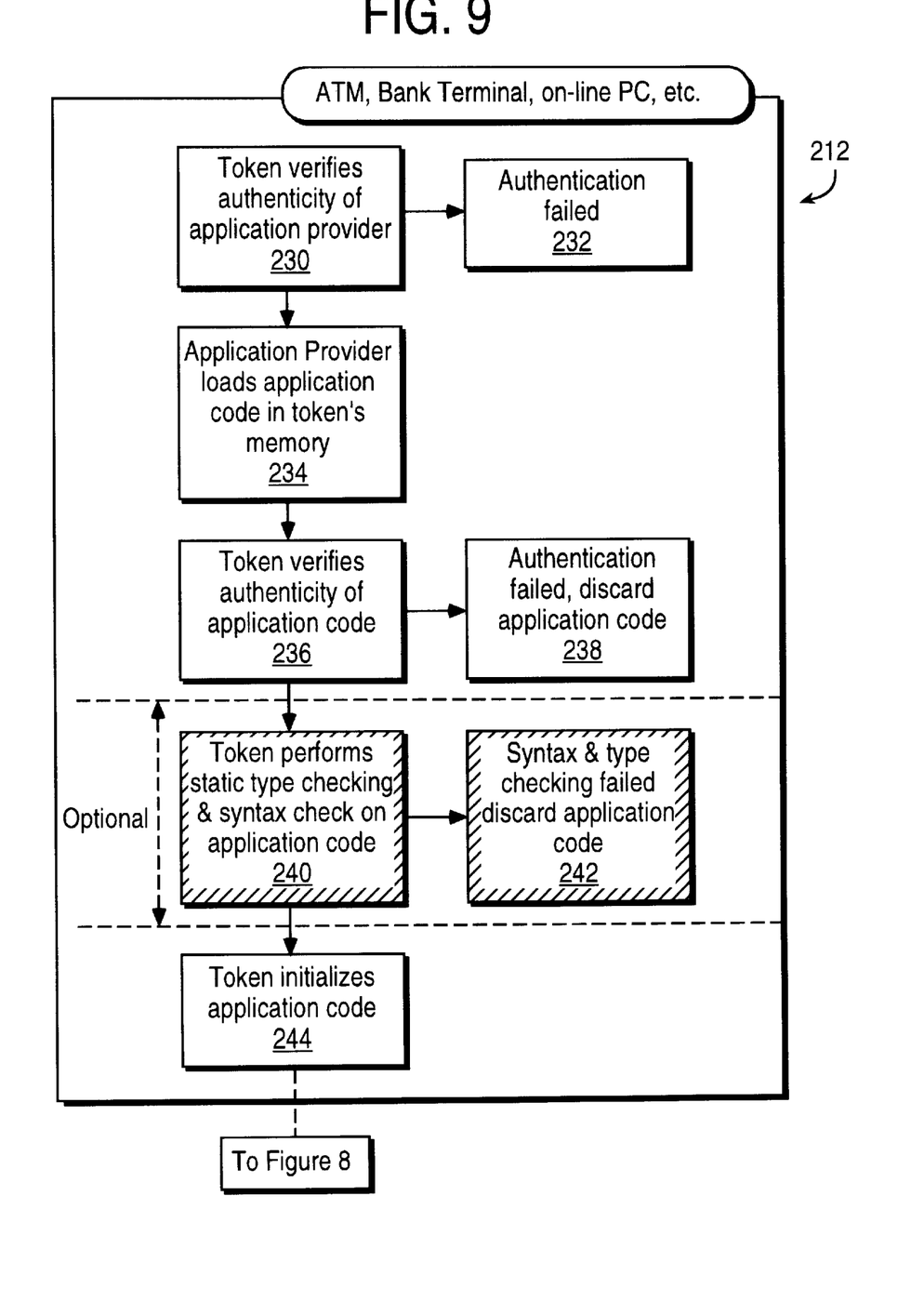
FIG. 9 is a flowchart of a method of replenishing the use rights of an application within a smart card in accordance with the invention.

FIG. 9 is a flowchart of the step 212 of FIG. 8, for replenishing the use rights of the applet in accordance with the invention. The applet may be selected because it has expended its use rights or because the user selects a particular applet. As described above, the universal loader can load any type of applet with any type of use rights from the server to the memory of the smart card. In addition, since the loader can load any type of applet, it is not necessary to get the use rights of the applet reloaded by the card issuer. Thus, the universal loader permits a greater amount of flexibility.

Once any of the applet with the associated use rights has been selected, at step 230, the smart card verifies the authenticity of the provider, such as the server, of the applet. If the authentication fails, then the method ends at step 232. If the authentication is successful, then in step 234, the provider, with the help of the loader, loads the applet into the NVM of the smart card.

Typically, authentication of the applet code may be achieved by the smart card through the verification of a digital signature, a cryptographic check sum or a predetermined hash value. In step 236, the smart card verifies the authenticity of the program code of the applet to detect viruses, and the like. In step 238, if the authentication of the applet code fails, then the applet code is deleted from the memory of the smart card.

The next step is an optional step that is not required in order to load an application into a smart card in accordance with the invention. This step requires a smart card with a larger amount of memory. In this optional step 240, the smart card may perform static type checking and a syntax check of the code of the applet. If this check fails, then in step 242, the applet code is deleted from the memory of the smart card. In the last step 244, the smart card initializes the code of the applet so that the use rights of the applet may be debited, as described above with reference to FIG. 8.

While the foregoing has been with reference to a particular embodiment of the invention, it will be appreciated by those skilled in the art that changes in this embodiment may be made without departing from the principles and spirit of the invention, the scope of which is defined by the appended claims.

We claim:

1. A system for loading an application and its associated use rights into a smart card having other applications, some of the other applications with associated use rights that have values that change as the application is used, the system comprising:

means for storing, remotely from said smart card, an application and use rights with a predetermined initial value, associated with the application;

said smart card having a processing unit, a memory unit for receiving applications having different use rights, the memory unit being connected to the processing unit and storing a second application having associated use rights;

means for connecting said smart card to said remote storage means; and means for loading said application, having use rights with a predetermined value, from said remote storage means into said smart card.

2. The system of claim 1, wherein the use rights have a refreshed state and a depleted state, the use rights of the second application being depleted and the use rights of the application being refreshed, and further comprising means for replacing said second application stored in the memory with said application at the remote storage means so that the use rights of the application in the memory are replenished.

3. The system of claim 2, wherein the connecting means further comprises means for verifying the authority of the remote storage means to load an application into the memory of the smart card.

4. Smart card apparatus for loading an application having use rights with values which meter use of the application, the smart card comprising:

a processor for executing an application;

a memory, connected to the processor, for storing multiple applications, including a first application having first use rights and having first values associated with the first use rights, the first value changing from a predetermined initial value with use of the first use rights;

an interface enabling the processor of said smart card to communicate with a remote location;

means for receiving, in the smart card, applications having different use rights, the applications including the first application and a second application from said remote location over said interface, the second application having second use rights; and means for storing said second application into said memory in said smart card.

5. The smart card apparatus of claim 4 further comprising means for replacing said first application stored in the memory with said second application from said remote location so that the use rights of the application in the memory are replenished.

6. The smart card apparatus of claim 5, wherein the receiving means further comprises means for verifying the authority of the remote location to load an application into the memory of the smart card.

7. A method of replenishing use rights in an application stored in a smart card, the use rights having a refreshed state and a depleted state and being depleted with use of the application, the smart card having a processor and a memory for storing the application, the method comprising:

connecting a smart card having a first application with use rights in a depleted state to a communications system, the communications system being connected to a system remotely located from said smart card, the system storing a second application having equivalent use rights to the first use rights, the equivalent use rights having a refreshed state;

verifying in the card that said remote storage system has the authority to replace the first application in the smart card; and replacing the first application in said memory with said second application having refreshed use rights so that the use rights of the application located within the memory of the smart card are replenished.

8. The method of claim 7, wherein replacing further comprises deleting said first application from said memory of said smart card, and loading said second application having refreshed use rights from said remote storage location into said memory of said smart card so that the use rights of the application located within the memory of the smart card are replenished.

9. A method of loading an application into a smart card, the application having use rights with a refreshed state and a depleted state and being depleted with use of the application, the smart card having a processor and a memory for storing the application, the method comprising:

connecting a smart card having a first application with use rights to a communications system, the communications system being connected to a system remotely located from said smart card, the system storing a second application having use rights;

verifying in the smart card that said remote storage system has the authority to load the second application into the smart card; and loading said second application having refreshed use rights into the memory of the smart card so that the second application may be used.

10. The method of claim 9, wherein the first application has depleted use rights, the second application having refreshed equivalent use rights to the first application, and wherein the loading comprises replacing the first application in said memory with said second application having refreshed use rights so that the use rights of the application located within the memory of the smart card are replenished.

11. Smart card apparatus for loading an application having use rights with values which meter use of the application, the smart card comprising:

a processor for executing an application;

a memory, connected to the processor, for storing multiple applications, including a first application having first use rights and having first values associated with the first use rights, the first value changing from a predetermined initial value with use of the first use rights;

means for loading, into the smart card, applications having different use rights, the applications including a first application and a second application from a remote location over an interface, the second application having second use rights;

means for storing said second application into said memory in said smart card; and means for changing the use rights of said first application and said second application.

12. The smart card apparatus of claim 11, where said second application has equivalent use rights to the first use rights, the equivalent use rights having a refreshed state, and wherein storing means further comprises means for replacing the first application in said memory with said second application having refreshed use rights so that the use rights of the application located within the memory of the smart card are replenished.

* * * * *